(12) United States Patent
Ishihara

(10) Patent No.: US 12,499,642 B2
(45) Date of Patent: Dec. 16, 2025

(54) IMAGE PROCESSING APPARATUS, IMAGE PROCESSING METHOD, AND COMPUTER-READABLE RECORDING MEDIUM

(71) Applicant: NEC Corporation, Tokyo (JP)

(72) Inventor: Kenta Ishihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 222 days.

(21) Appl. No.: 18/266,012

(22) PCT Filed: Dec. 10, 2020

(86) PCT No.: PCT/JP2020/046157
§ 371 (c)(1),
(2) Date: Jun. 8, 2023

(87) PCT Pub. No.: WO2022/123752
PCT Pub. Date: Jun. 16, 2022

(65) Prior Publication Data
US 2024/0029379 A1    Jan. 25, 2024

(51) Int. Cl.
*G06V 40/20* (2022.01)
*G06T 7/70* (2017.01)
(Continued)

(52) U.S. Cl.
CPC ........... *G06T 19/20* (2013.01); *G06T 7/70* (2017.01); *G06V 10/44* (2022.01); *G06T 2207/20044* (2013.01); *G06T 2219/2012* (2013.01)

(58) Field of Classification Search
CPC .. G06T 2207/20044; G06T 2219/2024; G06V 40/23
(Continued)

(56) References Cited

U.S. PATENT DOCUMENTS 9,390,315 B1 *  7/2016  Yalniz ................. G06T 7/90
12,067,679 B2 *  8/2024  Jee ..................... G06T 7/70
(Continued)

FOREIGN PATENT DOCUMENTS

JP    2001-052202 A    2/2001
JP    2005-222504 A    8/2005
(Continued)

OTHER PUBLICATIONS

Zhao et al., Human Interaction Recognition Based on Joint Sequence, 2020 7th International Conference on Information, Cybernetics, and Computational Social Systems (ICCSS), Date of Conference: Nov. 13-15, 2020, pp. 387-392 (Year: 2020).*
(Continued)

*Primary Examiner* — Samantha (Yuehan) Wang

(57) ABSTRACT

An image processing apparatus includes a visual recognition easiness level calculation unit and a visual feature adding unit. The visual recognition easiness level calculation unit calculates a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected. The visual feature adding unit adds a visual feature to the skeleton model in accordance with the visual recognition easiness level.

10 Claims, 20 Drawing Sheets

(51) Int. Cl.
*G06T 19/20* (2011.01)
*G06V 10/44* (2022.01)

(58) Field of Classification Search
USPC .......................................... 345/419
See application file for complete search history.

(56) References Cited

U.S. PATENT DOCUMENTS

| 2013/0230211 | A1 | 9/2013 | Tanabiki et al. | |
| 2015/0293525 | A1 | 10/2015 | Yamamoto et al. | |
| 2022/0084188 | A1* | 3/2022 | Onishi | G06T 7/0004 |
| 2022/0169381 | A1* | 6/2022 | Alrasheed | G05D 1/0094 |
| 2022/0301352 | A1* | 9/2022 | Sato | G06V 40/23 |
| 2024/0005591 | A1* | 1/2024 | Xu | G06T 15/205 |

FOREIGN PATENT DOCUMENTS

| JP | WO2021149250 A1 * | 1/2020 |
| WO | 2012/046392 A1 | 4/2012 |
| WO | 2014/080733 A1 | 5/2014 |

OTHER PUBLICATIONS

International Search Report for PCT Application No. PCT/JP2020/046157, mailed on Mar. 9, 2021.
English translation of Written opinion for PCT Application No. PCT/JP2020/046157, mailed on Mar. 9, 2021.

* cited by examiner

IMAGE PROCESSING APPARATUS, IMAGE PROCESSING METHOD, AND COMPUTER-READABLE RECORDING MEDIUM

This application is a National Stage Entry of PCT/JP2020/046157 filed on Dec. 10, 2020, the contents of all of which are incorporated herein by reference, in their entirety.

TECHNICAL FIELD

The invention relates to an image processing apparatus, an image processing method, and a computer-readable recording medium.

BACKGROUND ART

Conventionally, methods using a skeleton model have been proposed as methods for visualizing the posture of a person in an image captured by an imaging apparatus in a two-dimensional or three-dimensional space. A skeleton model is a model that represents a simplified skeleton of a human body. The skeleton model is generated by detecting key parts of a human body such as the head, shoulders, and joints in an image, and then connecting the points of the detected parts with lines. Patent Document 1 discloses an apparatus that estimates the posture of a person in an image by using such a skeleton model.

According to Patent Document 1, posture estimation using a skeleton model is performed on a computer. On the other hand, there are cases where a generated skeleton model is displayed on a display device, and an observer visually checks the displayed skeleton model to determine the posture of the person shown in the image from the skeleton model.

LIST OF RELATED ART DOCUMENT

Patent Document

Patent Document 1: WO 2012/046392

SUMMARY OF INVENTION

Problems to be Solved by the Invention

However, if only a skeleton model is displayed on a display device, the skeleton model is represented by lines, and thus the observer may find it difficult to intuitively determine the skeleton model depending on the circumstances. For example, if there is a plurality of people in a captured image and a plurality of skeleton models are displayed in an overlapping manner, it may be difficult for the observer to identify the overlapping skeleton models one by one. In addition, if there is an overlap in one skeleton model because the person in the image has crossed his/her arms, it may also be difficult for the observer to determine the posture of the skeleton model.

An example object of the invention is to provide an image processing apparatus and an image processing method that allow an observer to intuitively recognize a skeleton model representing the posture of a person on a two-dimensional screen, and a computer-readable recording medium that records a program for implementing the image processing apparatus and the image processing method.

Means for Solving the Problems

In order to achieve the above-described object, an image processing apparatus includes:

a visual recognition easiness level calculation unit that calculates a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and a visual feature adding unit that adds a visual feature to the skeleton model in accordance with the visual recognition easiness level.

In addition, in order to achieve the above-described object, an image processing method includes:

a step of calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and a step of adding a visual feature to the skeleton model in accordance with the visual recognition easiness level.

Furthermore, in order to achieve the above-described object, a computer readable recording medium according to an example aspect of the invention is a computer readable recording medium that includes recorded thereon a program, the program including instructions that cause a computer to carry out:

a step of calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and a step of adding a visual feature to the skeleton model in accordance with the visual recognition easiness level.

Advantageous Effects of the Invention

As described above, according to the invention, it is possible to it is possible to allow an observer to intuitively recognize a skeleton model representing the posture of a person on a two-dimensional screen.

EXAMPLE EMBODIMENT

Hereinafter, an image processing apparatus of an example embodiment will be described with reference to the drawings.

[Configuration of Apparatus]

Figure 1:
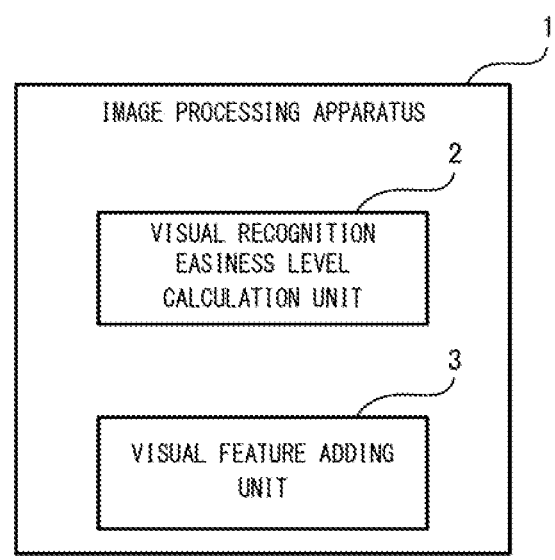
FIG. 1 is a configuration diagram illustrating a schematic configuration of an image processing apparatus of the example embodiment.

First, a schematic configuration of an image processing apparatus in the example embodiment will be described with reference to FIG. 1. FIG. 1 is a configuration diagram illustrating a schematic configuration of an image processing apparatus of the example embodiment.

As illustrated in FIG. 1, an image processing apparatus 1 includes a visual recognition easiness level calculation unit 2 and a visual feature adding unit 3.

The visual recognition easiness level calculation unit 2 calculates the easiness level of visual recognition of a skeleton model of a person built in a virtual space, by using three-dimensional skeleton information for specifying three-dimensional coordinates of the joints of the body of the person. The value of the visual recognition easiness level indicates the ease of visual recognition of a skeleton model on a two-dimensional screen onto which a three-dimensional skeleton model is projected. A method for calculating the visual recognition easiness level will be described later.

The visual feature adding unit 3 adds a visual feature to the skeleton model according to the visual recognition easiness level.

Figure 2:
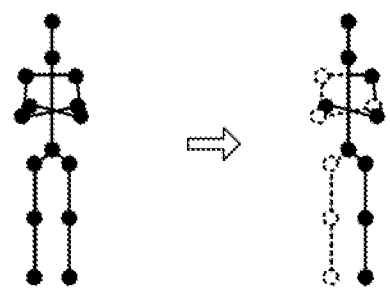
FIG. 2 is a diagram for describing a visual features added to skeleton models.
Figure 3:
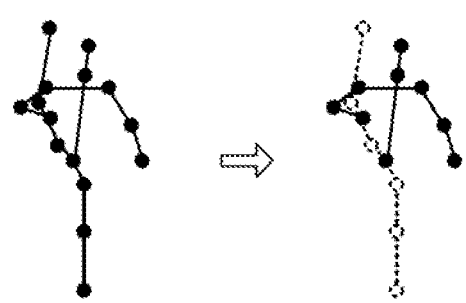
FIG. 3 is a diagram for describing a visual features added to skeleton models.
Figure 4:
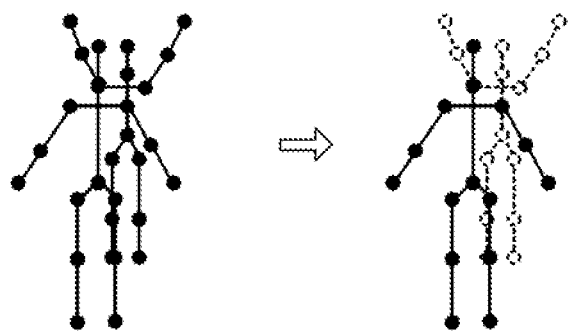
FIG. 4 is a diagram for describing a visual features added to skeleton models.

Visual features added by the visual feature adding unit 3 to a skeleton model will be described. FIGS. 2, 3, and 4 are diagrams for describing the visual features added to skeleton models.

The visual features refer to colors, line thickness, line type, and transparency, for example. In the present example embodiment, the visual features are colors. FIGS. 2 to 4 illustrate a skeleton model on a two-dimensional screen onto which a three-dimensional skeleton model is projected. In each of FIGS. 2 to 4, the left part illustrates a skeleton model to which no visual feature is added, and the right part illustrates a skeleton model to which a visual feature is added. In FIGS. 2 to 4, solid lines and broken lines indicate different colors. As illustrated in these figures, the skeleton models have joint points equivalent to the joints of a person's body and links connecting the joint points.

If there are overlapping parts of a skeleton model on a two-dimensional screen, when the two-dimensional screen is displayed on a display device, it may be difficult for an observer to intuitively determine the posture of the skeleton model. Thus, the visual feature adding unit 3 adds colors to the skeleton model. For example, FIG. 2 illustrates the skeleton model of a person with his/her arms crossed. In this case, the visual feature adding unit 3 adds different colors to the joint points and links on the left part of the body and the joint points and links on the right part of the body. This allows the observer to intuitively recognize that the arms overlap each other and easily determine the posture of the skeleton model.

FIG. 3 illustrates the skeleton model of a person with a raised leg and a hand overlapping each other. In this case, the visual feature adding unit 3 adds different colors to the joint points and links of the lower part of the body and the joint points and links of the upper part of the body. This allows the observer to intuitively recognize the overlap between the leg and hand and easily determine the posture of the skeleton model.

FIG. 4 illustrates two overlapping skeleton models. In this case, the visual feature adding unit 3 adds different colors to all joint points and links of one skeleton model and all joint points and links of the other skeleton model. This allows the observer to intuitively recognize the overlap between the two skeleton models and easily determine the respective postures of the two skeleton models.

In this manner, when a two-dimensional screen onto which a three-dimensional skeleton model is projected is displayed, the image processing apparatus 1 adds colors to the three-dimensional skeleton model such that the observer can intuitively recognize the posture of the skeleton model on the two-dimensional screen. According to the image processing apparatus 1, it is possible to allow the observer to intuitively recognize a skeleton model representing the posture of a person on a two-dimensional screen.

As another example of adding a visual feature, the visual feature adding unit 3 may change the thickness of lines of a skeleton model or change the transparency of lines of a skeleton model. The visual feature adding unit 3 may change the lines of a skeleton model to double lines or dotted lines. The visual feature adding unit 3 may further add a visual feature to only joint points or only links of a skeleton model.

Figure 5:
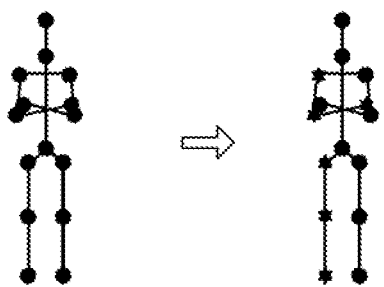
FIG. 5 is a diagram illustrating other example of visual feature.
Figure 6:
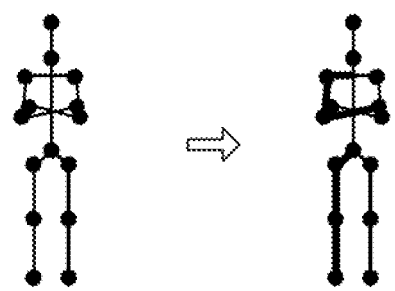
FIG. 6 is a diagram illustrating other example of visual feature.
Figure 7:
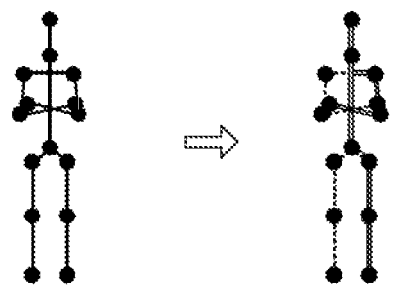
FIG. 7 is a diagram illustrating other example of visual feature.

FIGS. 5, 6, and 7 are diagrams illustrating other examples of visual features. As with FIG. 2, FIGS. 5, 6, and 7 each illustrate a skeleton model of a person with his/her arms crossed.

For example, as illustrated in FIG. 5, the visual feature adding unit 3 may add a visual feature to only joint points of the skeleton model. In the example of FIG. 5, the visual feature adding unit 3 indicates the joint points of the left part of the body and the joint points of the right part of the body with different shapes. More specifically, the visual feature adding unit 3 indicates the joint points of the left part of the body with a circular shape and indicates the joint points of the right part of the body with a star shape.

As illustrated in FIGS. 6 and 7, the visual feature adding unit 3 may add visual features to only links of a skeleton model. In the example of FIG. 6, the visual feature adding unit 3 indicates the links of the right part of the body and the links of the left part of the body with lines of different thicknesses. More specifically, the visual feature adding unit 3 indicates the links of the right part of the body with thicker lines than those of the links of the left part of the body. In the example of FIG. 7, the visual feature adding unit 3 indicates the links of the right part of the body and the links of the left part of the body with lines of different types. More specifically, the visual feature adding unit 3 indicates the links of the right part of the body with broken lines and indicates the links of the left part of the body with double lines.

Figure 8:
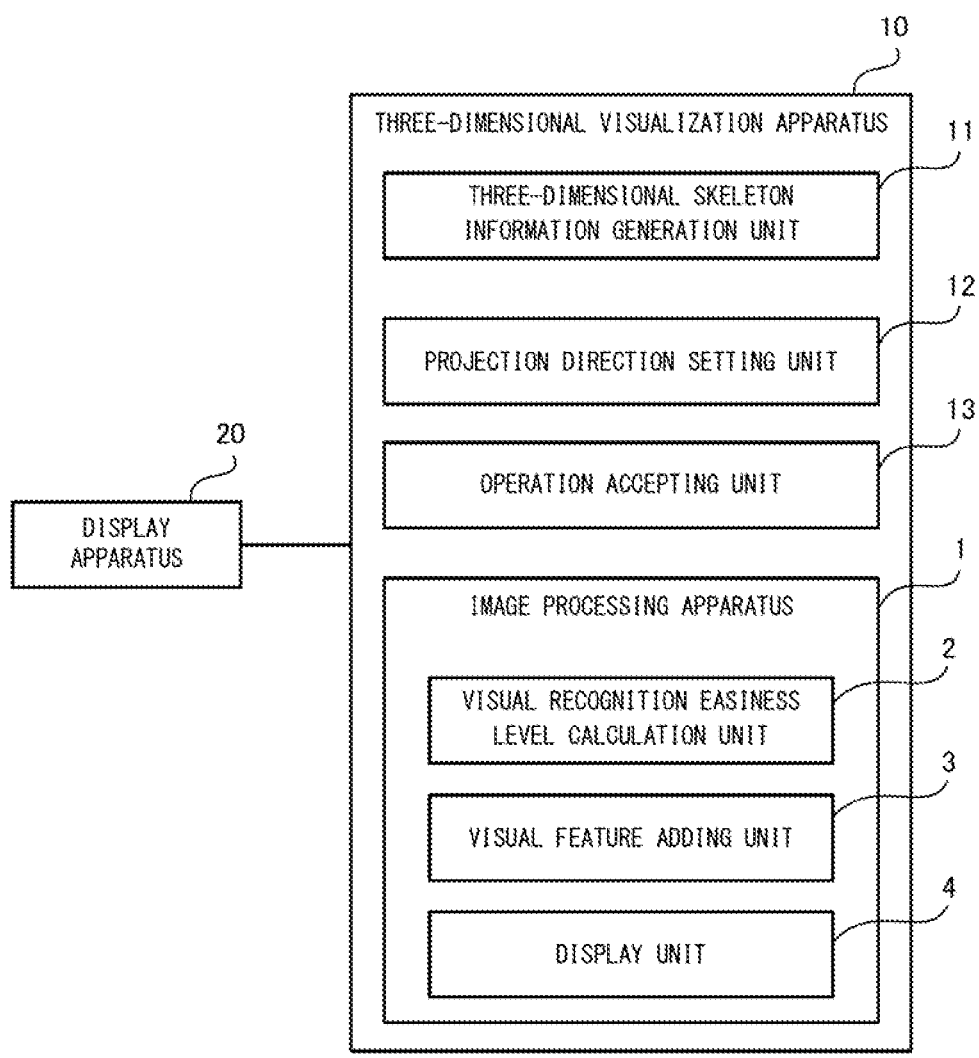
FIG. 8 is a configuration diagram of a three-dimensional visualization apparatus including the image processing apparatus of the example embodiment.

Subsequently, the configuration and functions of the image processing apparatus 1 in the present example embodiment will be described in detail with reference to FIGS. 8 to 15. In the following description, a three-dimensional visualization apparatus including the image processing apparatus 1 will be taken as an example. FIG. 8 is a configuration diagram of a three-dimensional visualization apparatus 10 including the image processing apparatus 1 of the present example embodiment.

A display apparatus 20 is connected to the three-dimensional visualization apparatus 10. The display apparatus 20 displays a two-dimensional screen onto which a three-dimensional skeleton model built in a virtual space is projected.

The three-dimensional visualization apparatus 10 includes the image processing apparatus 1, a three-dimensional skeleton information generation unit 11, a projection direction setting unit 12, and an operation accepting unit 13. Alternatively, the image processing apparatus 1 may include the three-dimensional skeleton information generation unit 11, the projection direction setting unit 12, and the operation accepting unit 13.

The three-dimensional skeleton information generation unit 11 generates three-dimensional skeleton information. The three-dimensional skeleton information is information for specifying the joints of the body of a person in an image captured by an imaging apparatus in a three-dimensional virtual space. The imaging apparatus is a camera with an imaging element such as a CCD sensor or a CMOS sensor, for example. The three-dimensional skeleton information generation unit 11 generates three-dimensional skeleton information from a two-dimensional image of a person captured by the imaging apparatus. Hereinafter, a method for generating the three-dimensional skeleton information will be described.

The three-dimensional skeleton information generation unit 11 generates two-dimensional skeleton information described in a coordinate system of the two-dimensional image of a person captured by the imaging apparatus. The two-dimensional skeleton information is information regarding positions of joints of the body of a person in a coordinate system of a two-dimensional image. Then, the three-dimensional skeleton information generation unit 11 converts the two-dimensional skeleton information into skeleton model description information described in a skeleton model coordinate system. The skeleton model coordinate system is a coordinate system in which one of the joints of the skeleton model of the two-dimensional skeleton information is set as the origin point or one point on a straight line connecting joints is set as the origin point, an axis passing through the origin point in parallel to a straight line passing through two joints is set as the X axis, and a straight line orthogonal to the X axis is set as the Y axis.

When converting the two-dimension skeleton information into the skeleton model description information, the three-dimensional skeleton information generation unit 11 calculates joint lengths and joint angles.

A joint length is the length of a straight line connecting joint points. For example, the three-dimensional skeleton information generation unit 11 sets the length of a shoulder line (a line segment connecting the right shoulder and the left shoulder) as 1 and determines other joint lengths as ratios to the shoulder line.

A joint angle is an angle formed by a line segment connecting adjacent joint points. For example, the angle of a line segment connecting the right shoulder and the right elbow is represented by the angle formed by a line segment connecting the right shoulder and the left shoulder and a line segment connecting the right shoulder and the right elbow.

In this manner, the three-dimensional skeleton information generation unit 11 converts the two-dimensional skeleton information into the skeleton model description information.

A storage unit (not illustrated) stores, in advance, three-dimensional skeleton models acquired by motion capture and two-dimensional skeleton models generated from the three-dimensional skeleton models, for example. The two-dimensional skeleton models include skeleton model description information described in a skeleton model coordinate system. The three-dimensional skeleton information generation unit 11 selects one of the two-dimensional skeleton models as a two-dimensional skeleton model corresponding to the posture of a person in an image captured by the imaging apparatus, based on the degree of similarity with the generated skeleton model description information and the two-dimensional skeleton models stored in the storage unit. The three-dimensional skeleton information generation unit 11 acquires the information regarding the three-dimensional skeleton model corresponding to the selected two-dimensional skeleton model, as the three-dimensional skeleton information. The three-dimensional skeleton information generation unit 11 generates the three-dimensional skeleton information by performing the above-described processing.

The method for generating the three-dimensional skeleton information is not limited to this. For example, the three-dimensional skeleton information generation unit 11 may generate the three-dimensional skeleton information by, with a two-dimensional image of a person captured by the imaging apparatus serving as input, directly estimating (deep learning) the positions of joints in the image and the distances of the joint positions from the camera. The imaging apparatus that captures an image of a person may be an imaging apparatus that uses a depth sensor, and the three-dimensional skeleton information generation unit 11 may generate three-dimensional skeleton information based on the results of image capturing by the imaging apparatus.

Figure 9:
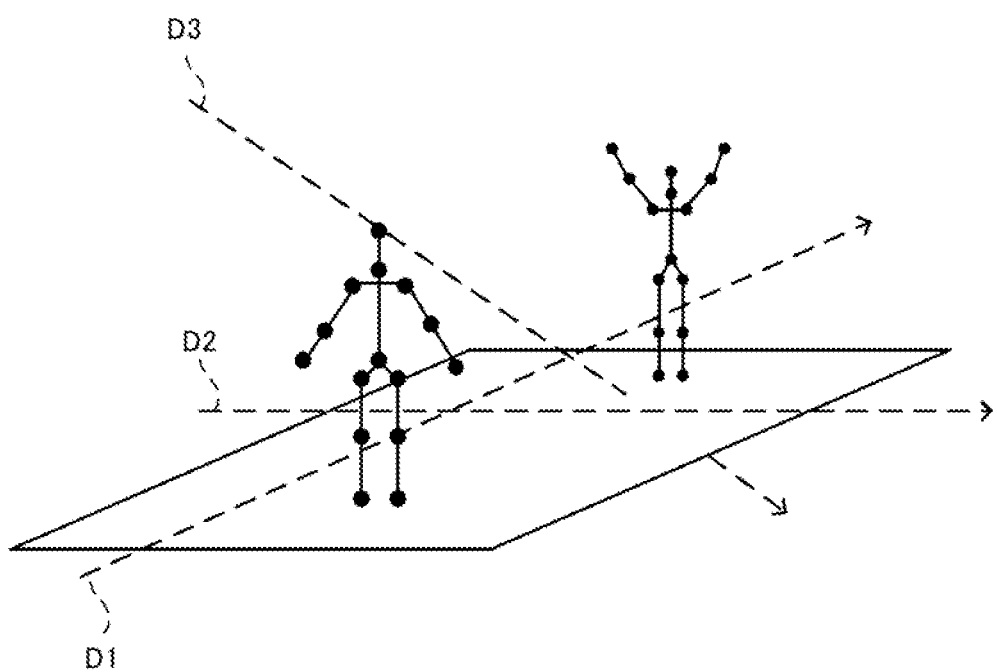
FIG. 9 is a diagram illustrating a virtual space in which projection direction is set.
Figure 10:
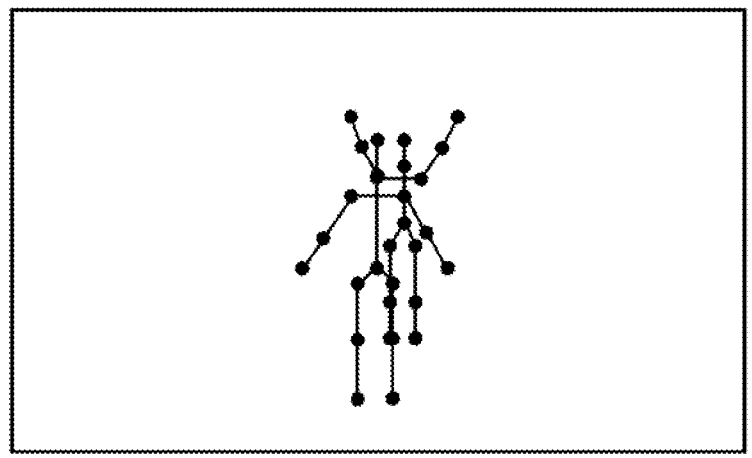
FIG. 10 is a diagram illustrating a two-dimensional screen onto which skeleton models are projected in a direction D1 in FIG. 9.
Figure 11:
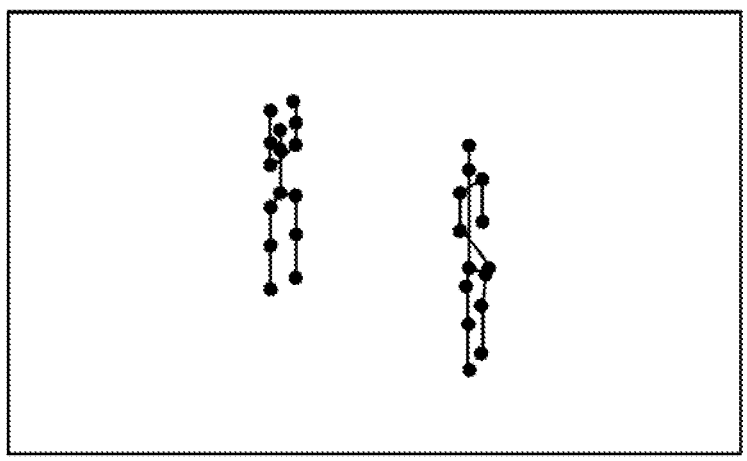
FIG. 11 is a diagram illustrating a two-dimensional screen onto which skeleton models are projected in a direction D2 in FIG. 9.
Figure 12:
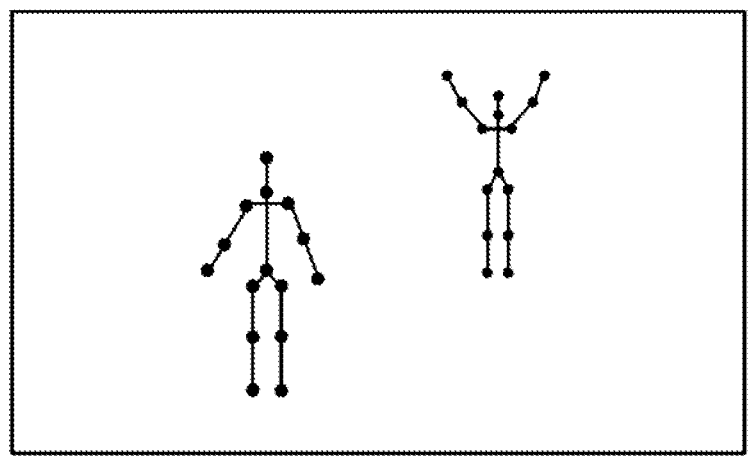
FIG. 12 is a diagram illustrating a two-dimensional screen onto which skeleton models are projected in a direction D3 in FIG. 9.

The projection direction setting unit 12 sets the projection direction in which three-dimensional skeleton models built in a virtual space using the three-dimensional skeleton information generated by the three-dimensional skeleton information generation unit 11 are to be projected onto a two-dimensional screen. FIG. 9 is a diagram illustrating a virtual space in which projection directions are set. As shown in FIG. 9, the projection directions are not particularly limited as far as they are different directions. FIG. 10 is a diagram illustrating a two-dimensional screen onto which skeleton models are projected in a direction D1 in FIG. 9. FIG. 11 is a diagram illustrating a two-dimensional screen onto which skeleton models are projected in a direction D2 in FIG. 9. FIG. 12 is a diagram illustrating a two-dimensional screen onto which skeleton models are projected in a direction D3 in FIG. 9. The number of projection directions set by the projection direction setting unit 12 may be one, two, four, or more.

The operation accepting unit 13 accepts operations performed by the observer. More specifically, the operation accepting unit 13 accepts the observer's operation of selecting a projection direction from among the projection directions set in the virtual space. The projection direction setting unit 12 selects a projection direction from among the set projection directions, based on the selection operation accepted by the operation accepting unit 13. The operation accepting unit 13 also accepts a change to the set projection direction. That is, the operation accepting unit 13 is a changing means that changes the projection direction.

The image processing apparatus 1 includes a visual recognition easiness level calculation unit 2, the visual feature adding unit 3, and a display unit 4.

When a three-dimensional skeleton model is projected onto a two-dimensional screen, the visual recognition easiness level calculation unit 2 calculates the visual recognition easiness level of the skeleton model on the two-dimensional screen. The visual recognition easiness level is a value indicating the ease of visual recognition of a skeleton model on a two-dimensional screen as described above. The visual recognition easiness level calculation unit 2 calculates the visual recognition easiness level of the skeleton model on the two-dimensional screen onto which the skeleton model is projected in the direction selected by the projection direction setting unit 12. For example, if the direction D1 in FIG. 9 is selected as the projection direction, the visual recognition easiness level calculation unit 2 calculates the visual recognition easiness level of the skeleton model on the two-dimensional screen illustrated in FIG. 10. If the direction D2 is selected as the projection direction, the visual recognition easiness level calculation unit 2 calculates the visual recognition easiness level of the skeleton model on the two-dimensional screen illustrated in FIG. 11. If the direction D3 is selected as the projection direction, the visual recognition easiness level calculation unit 2 calculates the visual recognition easiness level of the skeleton model on the two-dimensional screen illustrated in FIG. 12. The visual recognition easiness level calculation unit 2 may also calculate the visual recognition easiness level of the skeleton model on the two-dimensional screen onto which the skeleton model is projected in an unselected direction.

Hereinafter, three methods for calculating the visual recognition easiness level will be described.

(Method 1 for Calculating Visual Recognition Easiness Level)

The visual recognition easiness level calculation unit 2 determines the variance of all joint points in the vertical direction (y-axis coordinate) on a two-dimensional screen. The visual recognition easiness level calculation unit 2 also determines the variance of all joint points in the horizontal direction (x-axis coordinate) on the two-dimensional screen. On the two-dimensional screen, the coordinates of each joint point are represented by $(x_i, y_i)$ (i=1, 2, ... N, N: the number of joint points). Variance in the x direction is calculated by Equation (1) below. Variance in the y direction is calculated by Equation (2) below.

[Math. 1]

$$\sigma_x^2 = \frac{1}{N}\sum_{i=1}^{N}(x_i - \bar{x})$$ Equation (1)

where $\bar{x}$ is the average value of x.

$$\sigma_y^2 = \frac{1}{N}\sum_{i=1}^{N}(y_i - \bar{y})$$ Equation (2)

where $\bar{y}$ is the average value of y.

The visual recognition easiness level calculation unit 2 calculates the visual recognition easiness level, based on the variance $\sigma_x^2$ determined in the x direction and the variance $\sigma_y^2$ determined in the y direction. For example, the visual recognition easiness level calculation unit 2 sets the smaller of the variance $\sigma_x^2$ and the variance $\sigma_y^2$ as the visual recognition easiness level. Alternatively, the visual recognition easiness level calculation unit 2 sets the visual recognition easiness level as the average of the variance $\sigma_x^2$ and the variance $\sigma_y^2$.

(Method 2 for Calculating Visual Recognition Easiness Level)

The visual recognition easiness level calculation unit 2 calculates the number of times links intersect each other on a two-dimensional screen. For example, the visual recognition easiness level calculation unit 2 calculates the linear equation of the links in the coordinate system on the two-dimensional screen and calculates the intersection points to calculate the number of times the links intersect each other. Alternatively, the visual recognition easiness level calculation unit 2 calculates the number of times the links intersect each other by performing corner detection processing on the two-dimensional screen. Then, the visual recognition easiness level calculation unit 2 calculates the visual recognition easiness level based on the calculated number of times. For example, the visual recognition easiness level calculation unit 2 sets the visual recognition easiness level as 1/the number of times.

(Method 3 for Calculating Visual Recognition Easiness Level)

The visual recognition easiness level calculation unit 2 calculates the visual recognition easiness level by applying a skeleton model projected onto a two-dimensional screen to a model indicating the relationship between a skeleton model and a visual recognition easiness level built with machine learning using training data. The method of machine learning can be deep learning. The training data can be information obtained by projecting a three-dimensional skeleton model onto a two-dimensional screen and labels (correct-answer labels) indicating the visual recognition easiness level corresponding to the information. The information obtained by projecting a skeleton model onto a two-dimensional screen is coordinates of joint points of the skeleton model projected onto a two-dimensional screen, for example.

According to the method for building a model through machine learning, first, the information obtained by projecting a skeleton model onto a two-dimensional screen included in training data is input into the model to acquire an output result. Then, machine learning is performed by using, as training data, the acquired output result, the input information, and the correct-answer labels set by using the above-described calculation methods 1 and 2 to generate a model indicating the relationship between the skeleton model and the visual recognition easiness level.

The visual recognition easiness level calculation unit 2 inputs the coordinates of the joint points on the two-dimensional screen into the built model and acquires a visual recognition easiness level that is the output result.

The visual recognition easiness level calculation unit 2 may calculate the visual recognition easiness levels of an entire skeleton model or may calculate the visual recognition easiness level of a portion of a skeleton model. The visual recognition easiness level of a portion of a skeleton model is the visual recognition easiness level of the upper part, lower part, right part, or left part of one skeleton model, for example.

The visual feature adding unit 3 adds visual features to the three-dimensional skeleton model in accordance with the visual recognition easiness level calculated by the visual recognition easiness level calculation unit 2. The visual features are colors added to the joint points and links as described above with reference to FIGS. 2 to 7. The visual feature adding unit 3 adds different colors to the joint points and links in the upper part and the joint points and links in the lower part of one skeleton model, for example. When displaying the two-dimensional screen onto which the three-dimensional skeleton model is projected on the display apparatus 20, the skeleton model illustrated in the right part of FIG. 3 is displayed on the display apparatus 20. The visual feature adding unit 3 adds different colors to the joint points and links in one skeleton model and the joint points and links in another skeleton model, for example. When displaying the two-dimensional screen onto which the three-dimensional skeleton model is projected on the display apparatus 20, the skeleton model illustrated in the right part of FIG. 4 is displayed on the display apparatus 20. The visual feature adding unit 3 may add colors to the joint points and links in only one part, such as only the right arm or the right leg, for example, that are different from the colors of the other joint points and links. The rules for the visual feature adding unit 3 to add visual features will be described later.

In the present example embodiment, the visual feature adding unit 3 adds a visual feature to a three-dimensional skeleton model. Alternatively, the visual feature adding unit 3 may add a visual feature to a skeleton model projected onto a two-dimensional screen. As other examples of adding a visual feature, the visual feature adding unit 3 may change the thickness of the lines of a skeleton model or may change the transparency of the lines or the type of the lines, as described above with reference to FIGS. 5 to 7. The visual feature adding unit 3 may add a visual feature to only the joint points in a skeleton model or only the links in a skeleton model.

The display unit 4 displays the two-dimensional screen onto which the three-dimensional skeleton model with the visual feature added is projected, on the display apparatus 20.

[Operations of Apparatus]

Figure 13:
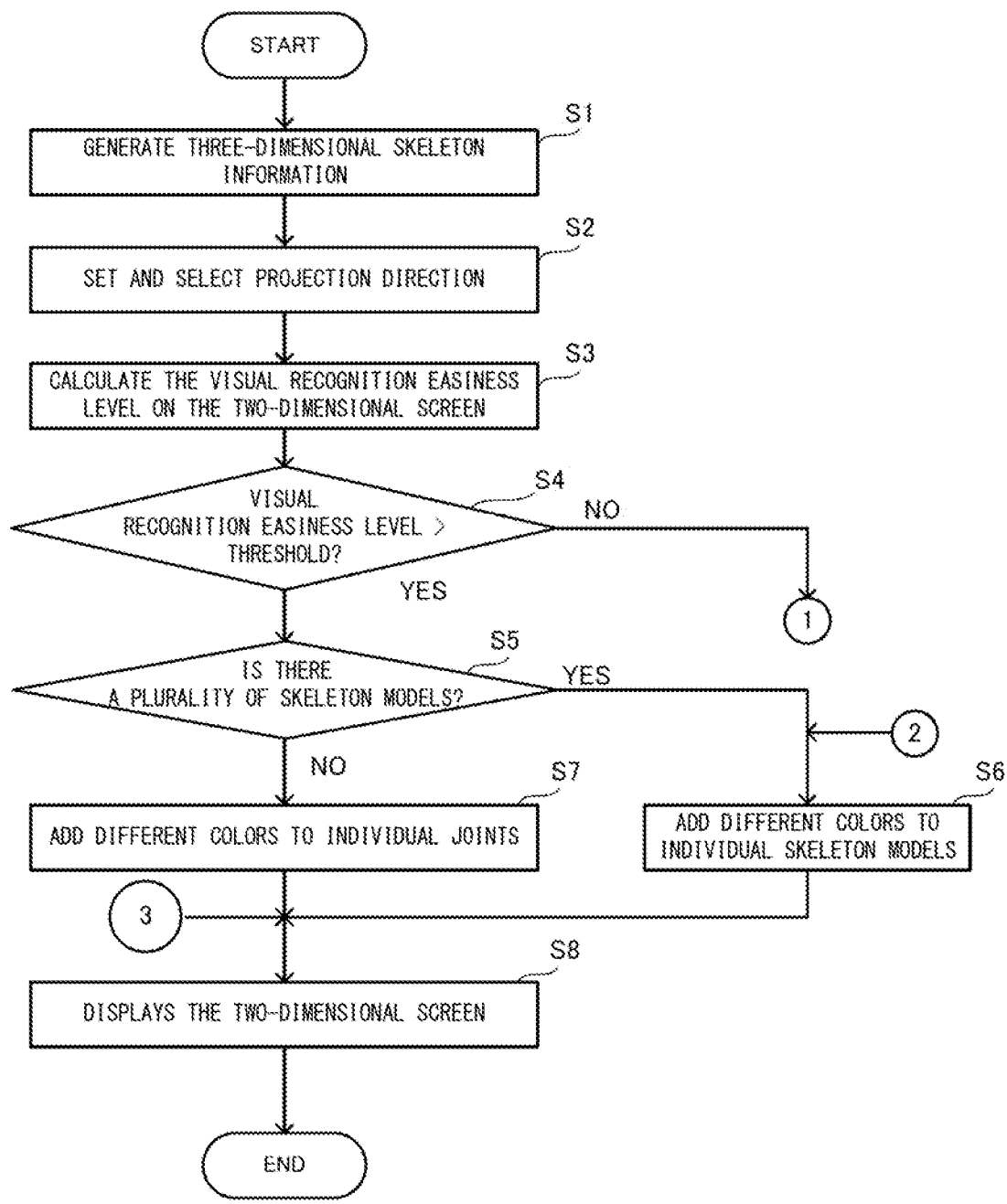
FIG. 13 is a flowchart of operations performed by the three-dimensional visualization apparatus including the image processing apparatus in the example embodiment.
Figure 14:
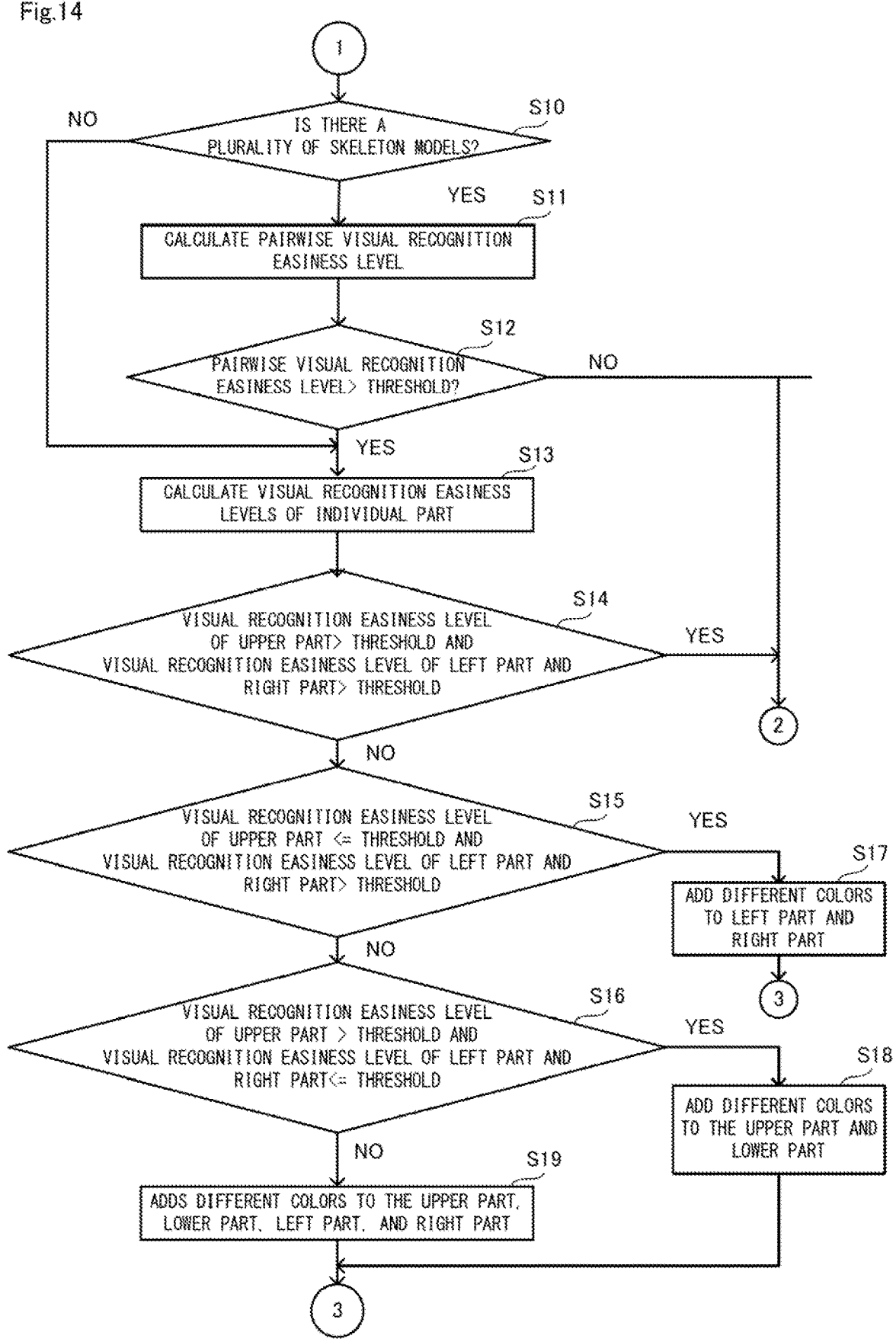
FIG. 14 is a flowchart of operations performed by the three-dimensional visualization apparatus including the image processing apparatus in the example embodiment.

Next, operations of the image processing apparatus in the example embodiment will be described with reference to FIGS. 13 and 14. FIGS. 13 and 14 are flowcharts of operations performed by the three-dimensional visualization apparatus 10 including the image processing apparatus 1 in the present example embodiment. In the following description, FIGS. 1 to 12 will be referred to as appropriate. In the example embodiment, the image processing apparatus 1 is operated to execute an image processing method. Accordingly, the description of the image processing method in the present example embodiment will be substituted with the following description of the operations performed by the image processing apparatus 1.

The three-dimensional skeleton information generation unit 11 generates three-dimensional skeleton information (step S1). The three-dimensional skeleton information generation unit 11 generates the three-dimensional skeleton information from a two-dimensional image of a person captured by the imaging apparatus as described above. Then, the projection direction setting unit 12 sets the projection directions in which a three-dimensional skeleton model is to be projected onto a two-dimensional screen, and selects the projection direction selected by the observer from among the set projection directions (step S2).

The visual recognition easiness level calculation unit 2 of the image processing apparatus 1 calculates the visual recognition easiness level of the three-dimensional skeleton model built in a virtual space using the three-dimensional skeleton information, on the two-dimensional screen onto which the three-dimensional skeleton model is projected in the selected projection direction (step S3). In step S3, the visual recognition easiness level calculation unit 2 calculates the visual recognition easiness level of an entire skeleton model on the two-dimensional screen.

The visual feature adding unit 3 determines whether the visual recognition easiness level calculated in step S3 exceeds a threshold (step S4). The threshold is a reference value for the observer to, when the two-dimensional screen is displayed on the display apparatus 20, determine whether the posture of the skeleton model on the two-dimensional screen is easy to visually recognize. The threshold is a value preset according to experimental rules, for example. If the visual recognition easiness level is the variance described above, the visual feature adding unit 3 determines in step S4 whether the variance exceeds the threshold. If the visual recognition easiness level is the number of times links intersect each other, the visual feature adding unit 3 determines in step S4 whether the value of 1/the number of times exceeds the threshold.

If the visual recognition easiness level exceeds the threshold (step S4: YES), the visual feature adding unit 3 determines whether there a plurality of skeleton models on the two-dimensional screen (step S5). If there are a plurality of skeleton models (step S5: YES), the visual feature adding unit 3 adds different colors to the individual skeleton models as described above with reference to FIG. 4 (step S6). If there is no more than one skeleton model (step S5: NO), the visual feature adding unit 3 adds different colors to the individual joints in the skeleton model (step S7). For example, the visual feature adding unit 3 adds different colors to the joint points and links of the left arm, the right arm, the left foot, the right foot, and the trunk. The display unit 4 projects the three-dimensional skeleton model with the added visual feature onto the two-dimensional screen, and displays the two-dimensional screen on the display apparatus 20 (step S8).

If the visual feature adding unit 3 determines in step S4 that the visual recognition easiness level calculated in step S3 does not exceed the threshold (step S4: NO), the visual feature adding unit 3 determines whether there are a plurality of skeleton models on the two-dimensional screen (step S10). If there is no more than one skeleton model (step S10: NO), the process moves to step S13 described later. If there are a plurality of skeleton models (step S10: YES), the visual recognition easiness level calculation unit 2 calculates pairwise visual recognition easiness level (step S11). The pairwise visual recognition easiness level refers to the visual recognition easiness level of any two skeleton models or two skeleton models specified by the observer from among the plurality of skeleton models on the two-dimensional screen. The pairwise visual recognition easiness level may be a visual recognition easiness level of three or more skeleton models.

The visual feature adding unit 3 determines whether the pairwise visual recognition easiness level exceeds a threshold (step S12). A case where the pairwise visual recognition easiness level exceeds the threshold is a case where one skeleton model does not overlap the other skeleton model or a case where skeleton models overlap insufficiently, for example. The threshold here may be the same as or different from the threshold used in step S4. If the pairwise visual recognition easiness level does not exceed the threshold (step S12: NO), the visual feature adding unit 3 adds different colors to the individual skeleton models (step S6).

If the pairwise visual recognition easiness level exceeds the threshold (step S12: YES), the visual recognition easiness level calculation unit 2 further calculates the visual recognition easiness levels of the individual parts of the individual skeleton models on the two-dimensional screen (step S13). The visual recognition easiness levels of the individual parts are the visual recognition easiness level of the upper part of the body, the visual recognition easiness level of the lower part of the body, the visual recognition easiness level of the left part of the body, and the visual recognition easiness level of the right part of the body. In this example, the visual recognition easiness levels of the upper and lower parts and right and left parts are set. However, the present invention is not limited to this. For example, the visual recognition easiness levels of the arms and legs may be set.

However, step S13 and the subsequent steps are performed on each of the skeleton models on the two-dimensional screen. For example, if there are two skeleton models on the two-dimensional screen, the visual recognition easiness level calculation unit 2 calculates the visual recognition easiness level of the upper part, the visual recognition easiness level of the lower part, the visual recognition easiness level of the left part, and the visual recognition easiness level of the right part of one skeleton model. The visual recognition easiness level calculation unit 2 also calculates the visual recognition easiness level of the upper part, the visual recognition easiness level of the lower part, the visual recognition easiness level of the left part, and the visual recognition easiness level of the right part of the other skeleton model. The visual feature adding unit 3 executes step S14 and subsequent steps on one skeleton model, and also executes step S14 and subsequent steps on the other skeleton model.

The visual feature adding unit 3 determines whether the visual recognition easiness level of the upper part or lower part of one skeleton model on the two-dimensional screen exceeds the threshold and whether the visual recognition easiness level of the left part or right part of the one skeleton model on the two-dimensional screen exceeds the threshold (step S14). The threshold in step S14 may be the same as or different from the threshold in step S4. If the visual recognition easiness level of the upper part or lower part exceeds the threshold and the visual recognition easiness level of the left part or right part exceeds the threshold (S14: YES), the visual feature adding unit 3 adds colors different from the colors of the other skeleton model to the one skeleton model (step S6).

If the visual recognition easiness level of the upper part or lower part does not exceed the threshold or the visual recognition easiness level of the left part or right part does not exceed the threshold (step S14: NO), the visual feature adding unit 3 determines whether the visual recognition easiness level of the upper part or lower part in the one skeleton model on the two-dimensional screen is equal to or less than the threshold and the visual recognition easiness level of the left part or right part in the one skeleton model on the two-dimensional screen exceeds the threshold (step S15). The threshold in step S15 is the same as the threshold in step S14. If the visual recognition easiness level of the upper part or lower part is equal to or less than the threshold and the visual recognition easiness level of the left part or right part exceeds the threshold (step S15: YES), the visual feature adding unit 3 adds different colors to the left part and right part of the one skeleton model (step S17). The display unit 4 projects the three-dimensional skeleton model with the added visual feature onto a two-dimensional screen and displays the two-dimensional screen on the display apparatus 20 (S8).

If the visual recognition easiness level of the upper part or lower part is not equal to or less than the threshold or the visual recognition easiness level of the left part or right part does not exceed the threshold (step S15: NO), the visual feature adding unit 3 determines whether the visual recognition easiness level of the upper part or lower part in the one skeleton model on the two-dimensional screen exceeds the threshold and the visual recognition easiness level of the left part or right part is equal to or less than the threshold (step S16). The threshold in step S16 is the same as the threshold in step S14. If the visual recognition easiness level of the upper part or lower part exceeds the threshold and the visual recognition easiness level of the left part or right part is equal to or less than the threshold (step S16: YES), the visual feature adding unit 3 adds different colors to the upper part and lower part of the one skeleton model (step S18). The display unit 4 projects the three-dimensional skeleton model with the added visual feature onto a two-dimensional screen and displays the two-dimensional screen on the display apparatus 20 (step S8).

If the visual recognition easiness level of the upper part or lower part does not exceed the threshold or the visual recognition easiness level of the left part or right part is not equal to or less than the threshold (step S16: NO), the visual feature adding unit 3 adds different colors to the upper part, lower part, left part, and right part of the one skeleton model (step S19). The display unit 4 projects the three-dimensional skeleton model with the added visual feature onto a two-dimensional screen and displays the two-dimensional screen on the display apparatus 20 (S8).

Figure 15:
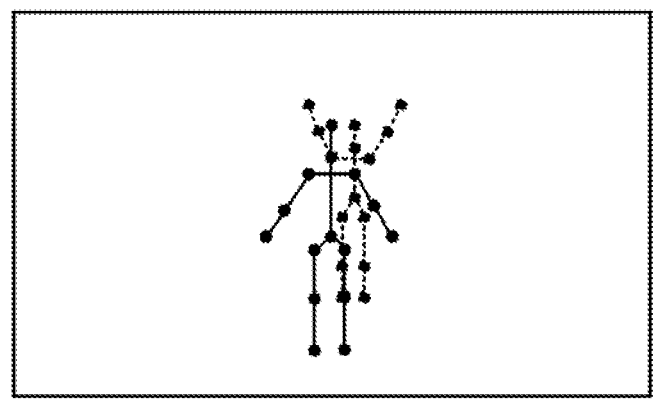
FIG. 15 is a diagram illustrating a display screen on a display apparatus before and after the projection direction change.
Figure 15:
Figure 15:
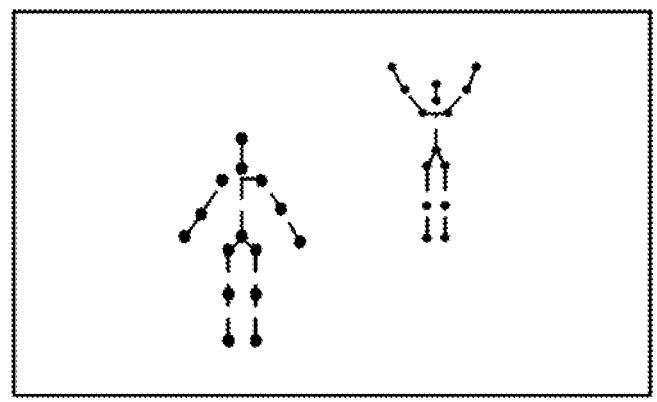

In step S8, after displaying the two-dimensional screen, selection of the projection direction in step S2 may be enabled, and the visual recognition easiness level may be re-calculated based on the selected projection direction, and colors may be added to the three-dimensional skeleton model. At this time, the visual feature adding unit 3 changes the visual feature (color) added to the three-dimensional skeleton model after the projection direction change from the visual feature (color) added to the three-dimensional skeleton model before the projection direction change. Accordingly, as illustrated in FIG. 15, the display apparatus 20 displays the skeleton model with a visual feature that differs between before and after switching of the display screen. FIG. 15 is a diagram illustrating the display screens on the display apparatus 20 before and after the projection direction change. The upper part of FIG. 15 illustrates the display screen before the projection direction change, and the lower part of FIG. 15 illustrates the display screen after the projection direction change. In this manner, the display screen of the display apparatus 20 can be changed switched as appropriate in response to the observer's operation of selecting a projection direction.

According to the present example embodiment as described above, adding colors to the joint points and links in a skeleton model allows the observer to intuitively recognize the skeleton model representing the posture of a person on a two-dimensional screen.

Modification Example 1

Figure 16:
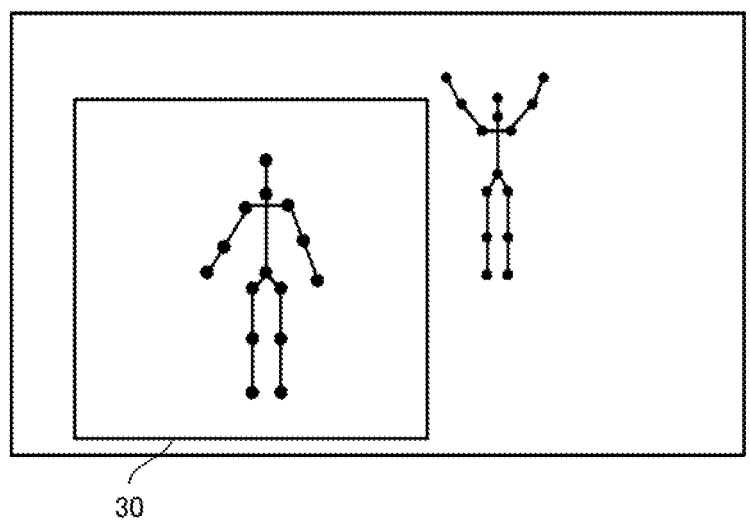
FIG. 16 is a diagram for describing an example in which a region is specified on a two-dimensional screen.

On a two-dimensional screen, a region in which a visual recognition easiness level is to be calculated and a visual feature is to be added may be specified. FIG. 16 is a diagram for describing an example in which a region is specified on a two-dimensional screen. For example, the display unit 4 displays a two-dimensional screen including a plurality of skeleton models on the display apparatus 20. At this time, the three-dimensional visualization apparatus 10 enables the specification of a region on the two-dimensional screen. The operation accepting unit 13 accepts an operation of specifying a region on the two-dimensional screen.

Upon the operation accepting unit 13 accepting the specification of a region 30 including only one skeleton model on the two-dimensional screen, the visual recognition easiness level calculation unit 2 calculates the visual recognition easiness level of the one skeleton model included in the region 30. As described in the flow charts of FIGS. 13 and 14, the visual feature adding unit 3 determines a visual feature to be added to the skeleton model in the specified region 30, based on the calculated visual recognition easiness level and the number of skeleton models in the region 30 (one in this example). Then, the visual feature adding unit 3 adds the determined visual feature to a three-dimensional skeleton model corresponding to the skeleton model in the region 30. The display unit 4 displays a two-dimensional screen onto which the skeleton model with the visual feature added is projected, on the display apparatus 20. This allows the observer to intuitively recognize only the posture of the necessary skeleton model.

Figure 17:
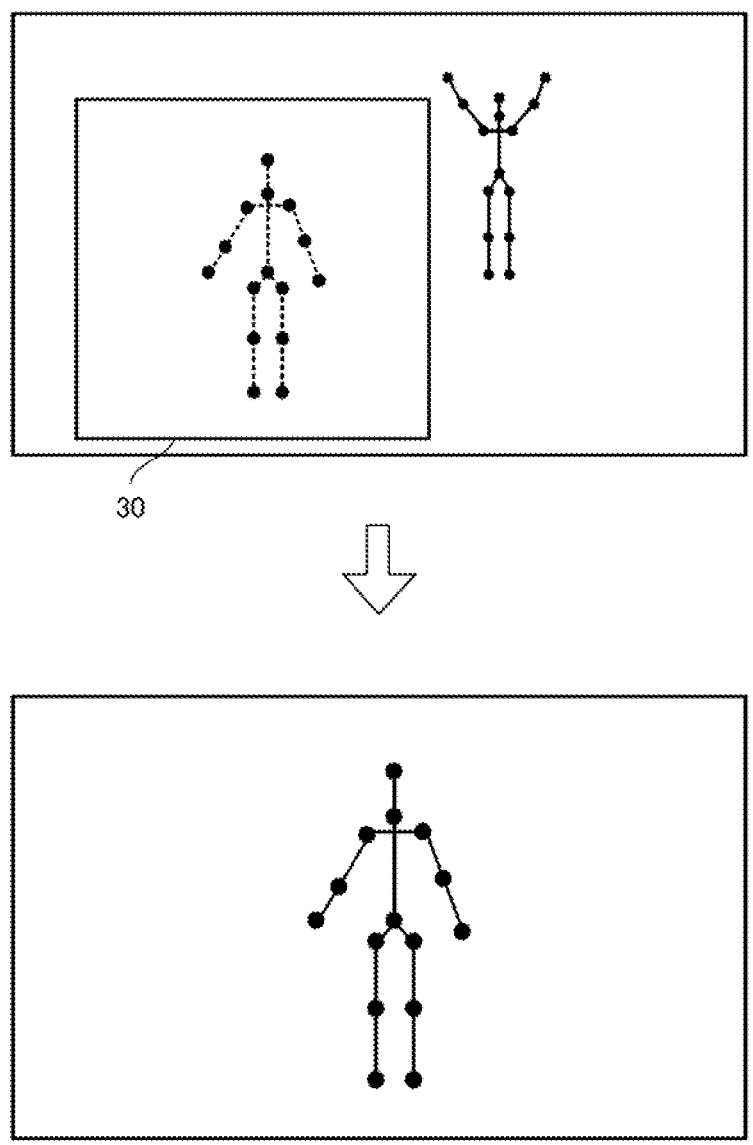
FIG. 17 is a diagram illustrating the display screen on the display apparatus before and after the region change.

After a visual feature has been added in the specified region 30, the specification of a region may be accepted again. In this case, the operation accepting unit 13 accepts a change in the specified region. That is, the operation accepting unit 13 is a change means that changes regions. The visual recognition easiness level calculation unit 2 calculates the visual recognition easiness level in the re-specified region. The visual feature adding unit 3 determines the visual feature to be added to the skeleton model in the specified region. The visual feature adding unit 3 adds the determined visual feature to the three-dimensional skeleton model. At this time, the visual feature adding unit 3 changes the visual feature added to the skeleton model after the region change from the visual feature added to the skeleton model before the region change. Accordingly, as illustrated in FIG. 17, the display apparatus 20 displays the skeleton model with a visual feature that differs between before and after switching of the display screen. FIG. 17 is a diagram illustrating the display screens on the display apparatus 20 before and after the region change. The upper part of FIG. 17 illustrates the display screen before the region change, and the lower part of FIG. 17 illustrates the display screen after the region change. In this manner, the display screen of the display apparatus 20 can be switched as appropriate in response to the observer's operation of specifying a region.

Modification Example 2

Figure 18:
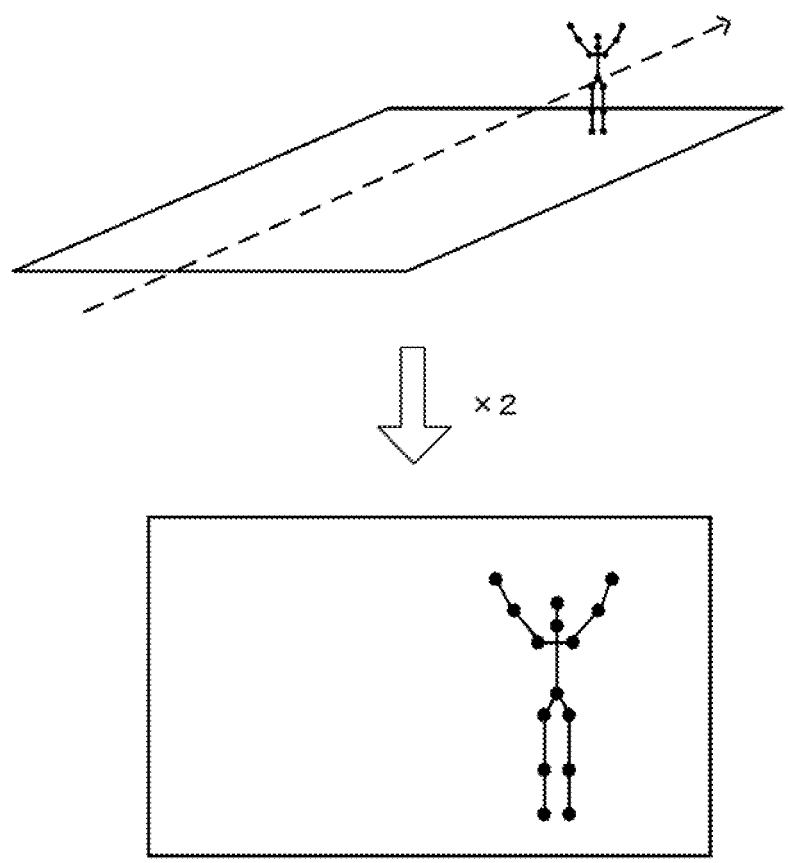
FIG. 18 is a diagram for describing an example in which enlargement ratio is specified in three-dimensional skeleton information.

In the three-dimensional skeleton information, the enlargement ratio at which a skeleton model is to be projected onto a two-dimensional screen can be specified. FIG. 18 is a diagram for describing an example in which the enlargement ratio is specified in the three-dimensional skeleton information. In this example, the operation accepting unit 13 accepts the specification of the enlargement ratio. Upon the operation accepting unit 13 accepting the specification of enlargement ratio of "two fold" in the three-dimensional virtual space shown on the upper part of FIG. 18, the skeleton model is projected onto the two-dimensional screen at a two-fold magnification as illustrated in the lower part of FIG. 18. The visual recognition easiness level calculation unit 2 calculates the visual recognition easiness level of the skeleton model enlarged and projected onto the two-dimensional screen. The visual feature adding unit 3 adds a visual feature to the three-dimensional skeleton model in the virtual space based on the calculated visual recognition easiness level. In this case, enlarging the skeleton model may increase the visual recognition easiness level, and thus it may be possible to allow the observer to more intuitively recognize the skeleton model on the two-dimensional screen.

Figure 19:
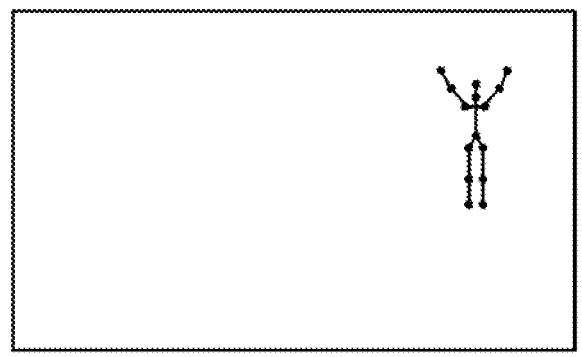
FIG. 19 is a diagram illustrating the display screen of the display apparatus before and after the enlargement ratio change.
Figure 19:
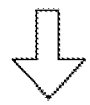
Figure 19:
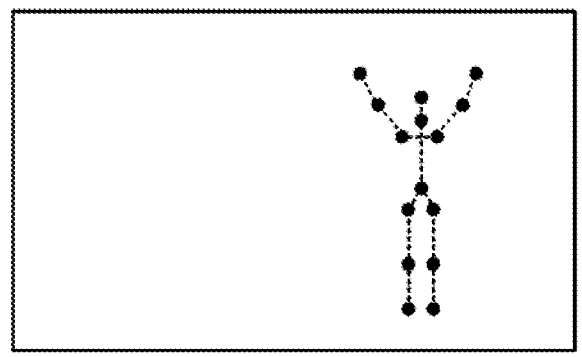

After the addition of the visual feature to the two-dimensional screen onto which the skeleton model is projected at the specified enlargement ratio, the specification of an enlargement ratio may be accepted again. In this case, the operation accepting unit 13 accepts a change to the specified enlargement ratio. That is, the operation accepting unit 13 is a change means that changes the enlargement ratio. The visual recognition easiness level calculation unit 2 calculates the visual recognition easiness level again based on the two-dimensional screen onto which the skeleton model is projected at the changed enlargement ratio. The visual feature adding unit 3 adds a visual feature to the three-dimensional skeleton model based on the calculated visual recognition easiness level. In this case, the visual feature adding unit 3 changes the visual feature added to the skeleton model after the enlargement ratio change from the visual feature added to the skeleton model before the enlargement ratio change. Accordingly, as illustrated in FIG. 19, the display apparatus 20 displays the skeleton model with a visual feature that differs between before and after switching of the display screen. FIG. 19 is a diagram illustrating the display screens of the display apparatus 20 before and after the enlargement ratio change. The upper part of FIG. 17 illustrates the display screen before the enlargement ratio change, and the lower part of FIG. 17 illustrates the display screen after the enlargement ratio change. In this manner, it is possible to switch the display screen of the display apparatus 20 as appropriate in response to the observer's operation of specifying the enlargement ratio.

[Programs]

A program in the example embodiment is program for causing a computer to execute steps S3 to S19 illustrated in FIGS. 13 and 14. The computer is formed by combining hardware units such as a CPU (for example, a multi-processor implementing a plurality of processor cores or the like), graphics processing units (GPUs), digital signal processors (DSPs), and field-programmable gate arrays (FPGAs). This program can be installed in the computer and executed by the computer to implement the image processing apparatus and the image processing method in the example embodiment. In this case, the processor of the computer functions as the visual recognition easiness level calculation unit 2, the visual feature adding unit 3, and the display unit 4 to perform the processing.

The computer may be a general-purpose PC, a smartphone, or a tablet terminal device.

The program in the example embodiment may be executed by a computer system that is built by a plurality of computers. In this case, the computers may each function as the visual recognition easiness level calculation unit 2, the visual feature adding unit 3, or the display unit 4, for example.

[Physical Configuration]

Figure 20:
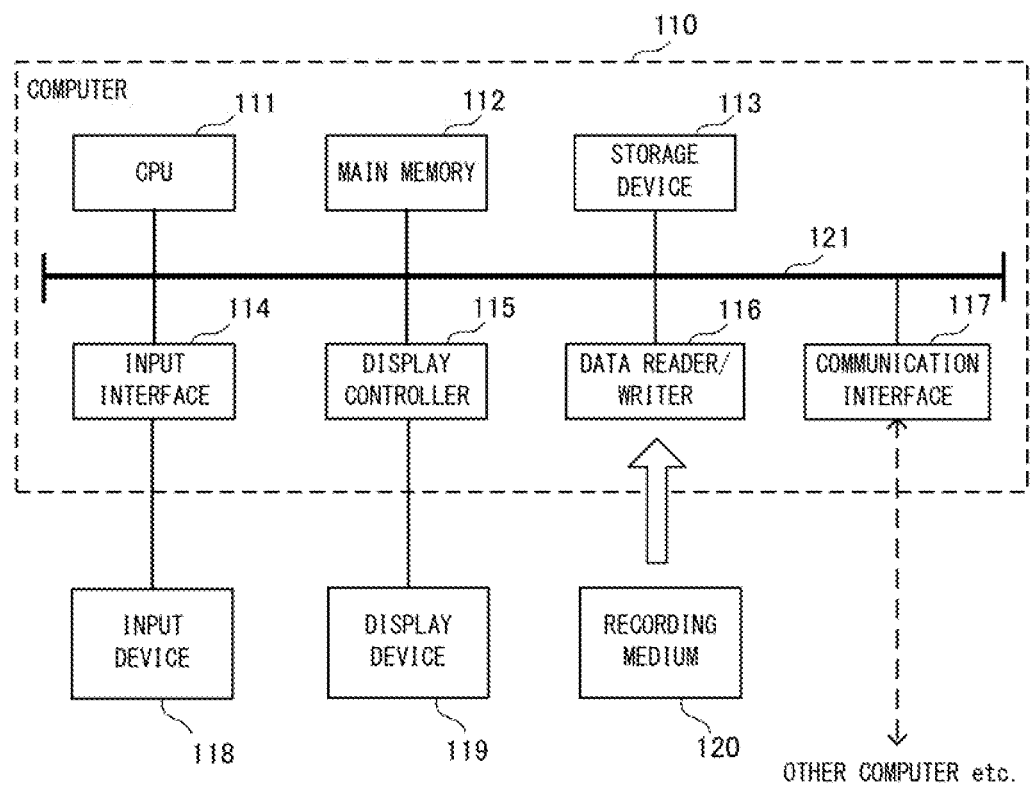
FIG. 20 is a block diagram illustrating an example of a computer that realizes the image processing apparatus according to the example embodiment.

Using FIG. 20, the following describes a computer that realizes the image processing apparatus by executing the program according to the example embodiment. FIG. 20 is a block diagram illustrating an example of a computer that realizes the image processing apparatus according to the example embodiment.

As shown in FIG. 20, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the image processing apparatus according to the example embodiment can also be realized by using items of hardware that respectively correspond to the components rather than the computer in which the program is installed. Furthermore, a part of the image processing apparatus according to the example embodiment may be realized by the program, and the remaining part of the image processing apparatus may be realized by hardware.

A part or an entirety of the above-described example embodiment can be represented by (Supplementary Note 1) to (Supplementary Note 30) described below but is not limited to the description below.

Supplementary Note 1

An image processing apparatus comprising:
a visual recognition easiness level calculation unit that calculates a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and
a visual feature adding unit that adds a visual feature to the skeleton model in accordance with the visual recognition easiness level.

Supplementary Note 2

The image processing apparatus according to Supplementary Note 1,
wherein the skeleton model has joint points that correspond to the joints of the person, and
the visual recognition easiness level calculation unit determines a variance of all the joint points in a vertical direction on the two-dimensional screen onto which the skeleton model is projected, determines a variance of all the joint points in a horizontal direction on the two-dimensional screen onto which the skeleton model is projected, and calculates the visual recognition easiness level based on the variance determined in the vertical direction and the variance determined in the horizontal direction.

Supplementary Note 3

The image processing apparatus according to Supplementary Note 1,
wherein the skeleton model has joint points that correspond to the joints of the person and links connecting the joint points, and
the visual recognition easiness level calculation unit calculates the number of times the links intersect each other on the two-dimensional screen onto which the skeleton model is projected, and calculates the visual recognition easiness level based on the calculated number of times.

Supplementary Note 4

The image processing apparatus according to Supplementary Note 1,
wherein the visual recognition easiness level calculation unit calculates the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

Supplementary Note 5 wherein, if a specific region is specified on the two-dimensional screen, the visual recognition easiness level calculation unit calculates the visual recognition easiness level of a skeleton model of a person projected onto the specific region, and the visual feature adding unit determines a visual feature to be added to the skeleton model of the person projected onto the specific region, based on the number of people projected onto the specific region and the visual recognition easiness level of the skeleton model of the person projected onto the specific region, and adds the determined visual feature to the skeleton model.

Supplementary Note 6

The image processing apparatus according to any one of Supplementary Notes 1 to 5, wherein the visual recognition easiness level calculation unit calculates the visual recognition easiness level of each part of the skeleton model on the two-dimensional screen, and the visual feature adding unit adds a different visual feature to each of the parts based on the calculated visual recognition easiness level of each of the parts.

Supplementary Note 7

The image processing apparatus according to any one of Supplementary Notes 1 to 6, further comprising a display unit that displays the two-dimensional screen onto which the skeleton model with the added visual feature is projected.

Supplementary Note 8

The image processing apparatus according to Supplementary Note 7, wherein, if a projection direction in which the skeleton model is to be projected onto the two-dimensional screen is specified, the visual recognition easiness level calculation unit calculates the visual recognition easiness level when the skeleton model is projected in the specified projection direction, the visual feature adding unit adds, in accordance with the calculated visual recognition easiness level, the visual feature to the skeleton model projected onto the two-dimensional screen in the specified projection direction, and the display unit displays the two-dimensional screen onto which the skeleton model with the added visual feature is projected in the specified projection direction.

Supplementary Note 9

The image processing apparatus according to any one of Supplementary Notes 1 to 8, wherein the visual feature adding unit adds, as the visual feature, a different color to each part of the skeleton model or adds a color different from another skeleton model, to the skeleton model.

Supplementary Note 10

An image processing apparatus comprising:

a display unit that projects a skeleton model of a person onto a two-dimensional screen in a predetermined direction set in a virtual space, the skeleton model being built in the virtual space using three-dimensional skeleton information specifying three-dimensional coordinates of joints of the person;

a change unit that changes the predetermined direction; and a visual feature adding unit that adds a visual feature to the skeleton model, wherein the visual feature adding unit changes the visual feature added to the skeleton model projected onto the two-dimensional screen after the predetermined direction is changed from the visual feature added to the skeleton model projected onto the two-dimensional screen before the change to the predetermined direction.

Supplementary Note 11

An image processing apparatus comprising:

a display unit that projects a skeleton model of a person onto a two-dimensional screen at an enlargement ratio set in a virtual space, the skeleton model being built in the virtual space using three-dimensional skeleton information specifying three-dimensional coordinates of joints of the person;

a change unit that changes the enlargement ratio; and a visual feature adding unit that adds a visual feature to the skeleton model, wherein the visual feature adding unit changes the visual feature added to the skeleton model projected onto the two-dimensional screen after the enlargement ratio is changed from the visual feature added to the skeleton model projected onto the two-dimensional screen before the change to the enlargement ratio.

Supplementary Note 12

An image processing apparatus comprising:

a display unit that projects a skeleton model of a person onto a two-dimensional screen based on a specific region set in a virtual space, the skeleton model being built in the virtual space using three-dimensional skeleton information specifying three-dimensional coordinates of joints of the person;

a change unit that changes the specific region; and a visual feature adding unit that adds a visual feature to the skeleton model, wherein the visual feature adding unit changes the visual feature added to the skeleton model projected onto the two-dimensional screen after the specific region is changed from the visual feature added to the skeleton model projected onto the two-dimensional screen before the change to the specific region.

Supplementary Note 13

An image processing method comprising:

a step of calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and a step of adding a visual feature to the skeleton model in accordance with the visual recognition easiness level.

Supplementary Note 14

The image processing method according to Supplementary Note 13,
wherein the skeleton model has joint points that correspond to the joints of the person, and
the step of calculating the visual recognition easiness level includes determining a variance of all the joint points in a vertical direction on the two-dimensional screen onto which the skeleton model is projected, determining a variance of all the joint points in a horizontal direction on the two-dimensional screen onto which the skeleton model is projected, and calculating the visual recognition easiness level based on the variance determined in the vertical direction and the variance determined in the horizontal direction.

Supplementary Note 15

The image processing method according to Supplementary Note 13,
wherein the skeleton model has joint points that correspond to the joints of the person and links connecting the joint points, and
the step of calculating the visual recognition easiness level includes calculating the number of times the links intersect each other on the two-dimensional screen onto which the skeleton model is projected, and calculating the visual recognition easiness level based on the calculated number of times.

Supplementary Note 16

The image processing method according to Supplementary Note 13,
wherein the step of calculating the visual recognition easiness level includes calculating the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

Supplementary Note 17

The image processing method according to any one of Supplementary Notes 13 to 16,
wherein the step of calculating the visual recognition easiness level includes, if a specific region is specified on the two-dimensional screen, calculating the visual recognition easiness level of a skeleton model of a person projected onto the specific region, and
the step of adding the visual feature includes determining a visual feature to be added to the skeleton model of the person projected onto the specific region, based on the number of people projected onto the specific region and the visual recognition easiness level of the skeleton model of the person projected onto the specific region, and adding the determined visual feature to the skeleton model.

Supplementary Note 18

The image processing method according to any one of Supplementary Notes 13 to 17,
wherein the step of calculating the visual recognition easiness level includes calculating the visual recognition easiness level of each part of the skeleton model on the two-dimensional screen, and
the step of adding the visual feature includes adding a different visual feature to each of the parts based on the calculated visual recognition easiness level of each of the parts.

Supplementary Note 19

The image processing method according to any one of Supplementary Notes 13 to 18, further comprising
a step of displaying the two-dimensional screen onto which the skeleton model with the added visual feature is projected.

Supplementary Note 20

The image processing method according to Supplementary Note 19,
wherein the step of calculating the visual recognition easiness level includes, if a projection direction in which the skeleton model is to be projected onto the two-dimensional screen is specified, calculating the visual recognition easiness level when the skeleton model is projected in the specified projection direction,
the step of adding the visual feature includes adding, in accordance with the calculated visual recognition easiness level, the visual feature to the skeleton model projected onto the two-dimensional screen in the specified projection direction, and
the step of displaying includes displaying the two-dimensional screen onto which the skeleton model with the added visual feature is projected in the specified projection direction.

Supplementary Note 21

The image processing method according to any one of Supplementary Notes 13 to 20,
wherein the step of adding the visual feature includes adding, as the visual feature, a different color to each part of the skeleton model or adding a color different from another skeleton model, to the skeleton model.

Supplementary Note 22

A computer-readable recording medium that includes a program recorded thereon, the program including instructions that cause a computer to carry out:
a step of calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected; and a step of adding a visual feature to the skeleton model in accordance with the visual recognition easiness level.

Supplementary Note 23

The computer-readable recording medium according to Supplementary Note 22,
wherein the skeleton model has joint points that correspond to the joints of the person, and
the step of calculating the visual recognition easiness level includes determining a variance of all the joint points in a vertical direction on the two-dimensional screen onto which the skeleton model is projected, determining a variance of all the joint points in a horizontal direction on the two-dimensional screen onto which the skeleton model is projected, and calculating the visual recognition easiness level based on the variance determined in the vertical direction and the variance determined in the horizontal direction.

Supplementary Note 24

The computer-readable recording medium according to Supplementary Note 22,
wherein the skeleton model has joint points equivalent to the joints of the person and links connecting the joint points, and
the step of calculating the visual recognition easiness level includes calculating the number of times the links intersect each other on the two-dimensional screen onto which the skeleton model is projected, and calculating the visual recognition easiness level based on the calculated number of times.

Supplementary Note 25

The computer-readable recording medium according to Supplementary Note 22,
wherein the step of calculating the visual recognition easiness level includes calculating the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

Supplementary Note 26

The computer-readable recording medium according to any one of Supplementary Notes 22 to 25, wherein the step of calculating the visual recognition easiness level includes, if a specific region is specified on the two-dimensional screen, calculating the visual recognition easiness level of a skeleton model of a person projected onto the specific region, and
the step of adding the visual feature includes determining a visual feature to be added to the skeleton model of the person projected onto the specific region, based on the number of people projected onto the specific region and the visual recognition easiness level of the skeleton model of the person projected onto the specific region, and adding the determined visual feature to the skeleton model.

Supplementary Note 27

The computer-readable recording medium according to any one of Supplementary Notes 22 to 26, wherein the step of calculating the visual recognition easiness level includes calculating the visual recognition easiness level of each part of the skeleton model on the two-dimensional screen, and
the step of adding the visual feature includes adding a different visual feature to each of the parts based on the calculated visual recognition easiness level of each of the parts.

Supplementary Note 28

The computer-readable recording medium according to any one of Supplementary Notes 22 to 27,
wherein the program further includes an instruction that causes the computer to carry out:
a step of displaying the two-dimensional screen onto which the skeleton model with the added visual feature is projected.

Supplementary Note 29

The computer-readable recording medium according to Supplementary Note 28,
wherein the step of calculating the visual recognition easiness level includes, if a projection direction in which the skeleton model is to be projected onto the two-dimensional screen is specified, calculating the visual recognition easiness level when the skeleton model is projected in the specified projection direction,
the step of adding the visual feature includes adding, in accordance with the calculated visual recognition easiness level, the visual feature to the skeleton model projected onto the two-dimensional screen in the specified projection direction, and
the step of displaying includes displaying the two-dimensional screen onto which the skeleton model with the added visual feature is projected in the specified projection direction.

Supplementary Note 30

The computer-readable recording medium according to any one of Supplementary Notes 22 to 29,
wherein the step of adding the visual feature includes adding, as the visual feature, a different color to each part of the skeleton model or adding a color different from another skeleton model, to the skeleton model.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

According to the invention, it is possible to allow an observer to intuitively recognize a skeleton model representing the posture of a person on a two-dimensional screen. The invention is useful when projecting a three-dimensional skeleton model onto a two-dimensional screen and observing the two-dimensional screen.

REFERENCE SIGNS LIST

1 Image processing apparatus
2 Visual recognition easiness level calculation unit
3 Visual feature adding unit
4 Display unit
10 Three-dimensional visualization apparatus
11 Three-dimensional skeleton information generation unit
12 Projection direction setting unit
13 Operation accepting unit
20 Display apparatus
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. An image processing apparatus comprising:
at least one memory storing instructions; and
at least one processor configured to execute the instructions to:
calculate a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected;
add a visual feature to the skeleton model in accordance with the visual recognition easiness level; and
calculate the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

2. The image processing apparatus according to claim 1, wherein the skeleton model has joint points that correspond to the joints of the person, and
further at least one processor configured to execute the instructions to:
determine a variance of all the joint points in a vertical direction on the two-dimensional screen onto which the skeleton model is projected, determine a variance of all the joint points in a horizontal direction on the two-dimensional screen onto which the skeleton model is projected, and calculate the visual recognition easiness level based on the variance determined in the vertical direction and the variance determined in the horizontal direction.

3. The image processing apparatus according to claim 1, wherein the skeleton model has joint points that correspond to the joints of the person and links connecting the joint points, and
further at least one processor configured to execute the instructions to:
calculate the number of times the links intersect each other on the two-dimensional screen onto which the skeleton model is projected, and calculate the visual recognition easiness level based on the calculated number of times.

4. The image processing apparatus according to claim 1, wherein, further at least one processor configured to execute the instructions to:
if a specific region is specified on the two-dimensional screen, calculate the visual recognition easiness level of a skeleton model of a person projected onto the specific region, and
further at least one processor configured to execute the instructions to:
determine a visual feature to be added to the skeleton model of the person projected onto the specific region, based on the number of people projected onto the specific region and the visual recognition easiness level of the skeleton model of the person projected onto the specific region, and add the determined visual feature to the skeleton model.

5. The image processing apparatus according to claim 1, further at least one processor configured to execute the instructions to:
calculate the visual recognition easiness level of each part of the skeleton model on the two-dimensional screen, and
add a different visual feature to each of the parts based on the calculated visual recognition easiness level of each of the parts.

6. The image processing apparatus according to claim 1, further at least one processor configured to execute the instructions to:
display the two-dimensional screen onto which the skeleton model with the added visual feature is projected.

7. The image processing apparatus according to claim 6, wherein, if a projection direction in which the skeleton model is to be projected onto the two-dimensional screen is specified,
further at least one processor configured to execute the instructions to:
calculate the visual recognition easiness level when the skeleton model is projected in the specified projection direction,
add, in accordance with the calculated visual recognition easiness level, the visual feature to the skeleton model projected onto the two-dimensional screen in the specified projection direction, and
display the two-dimensional screen onto which the skeleton model with the added visual feature is projected in the specified projection direction.

8. The image processing apparatus according to claim 1, further at least one processor configured to execute the instructions to:
add, as the visual feature, a different color to each part of the skeleton model or adds a color different from another skeleton model, to the skeleton model.

9. An image processing method comprising:
calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected;

adding a visual feature to the skeleton model in accordance with the visual recognition easiness level; and calculating the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

10. A non-transitory computer-readable recording medium that includes a program recorded thereon, the program including instructions that cause a computer to carry out:

calculating a visual recognition easiness level, the visual recognition easiness level indicating the ease of recognition of a skeleton model of a person that is built in a virtual space using three-dimensional skeleton information specifying three-dimensional coordinates of joints of the person, on a two-dimensional screen onto which the skeleton model is projected;

adding a visual feature to the skeleton model in accordance with the visual recognition easiness level; and calculating the visual recognition easiness level by applying the skeleton model projected onto the two-dimensional screen to a model that indicates a relationship between the skeleton model and the visual recognition easiness level, the model being built through machine learning using information obtained by projecting the skeleton model onto the two-dimensional screen and a label indicating the visual recognition easiness level corresponding to the information as training data.

* * * * *